Feb. 2, 1932.  L. H. MESSINGER, JR  1,843,238
BRAKING ATTACHMENT FOR INTERNAL COMBUSTION ENGINES
Filed March 15, 1927  2 Sheets-Sheet 1

INVENTOR
Lester H. Messinger, Jr.
BY
G. H. Braddock
ATTORNEY

Feb. 2, 1932.  L. H. MESSINGER, JR  1,843,238
BRAKING ATTACHMENT FOR INTERNAL COMBUSTION ENGINES
Filed March 15, 1927  2 Sheets-Sheet 2
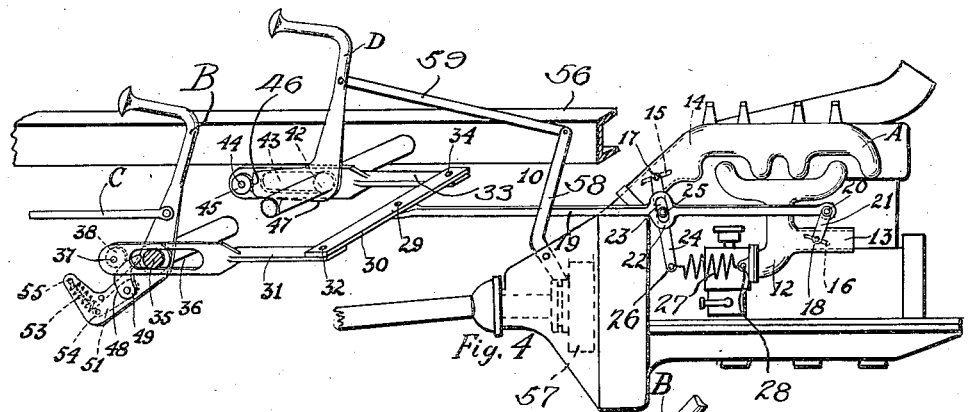
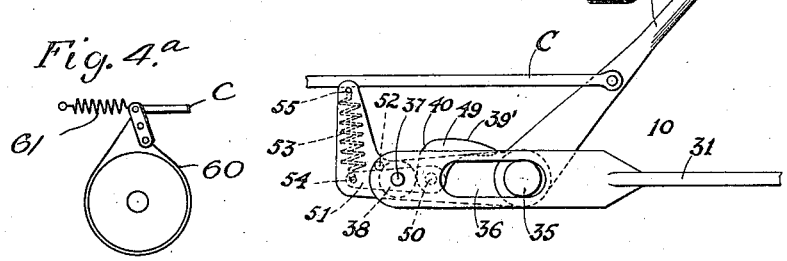
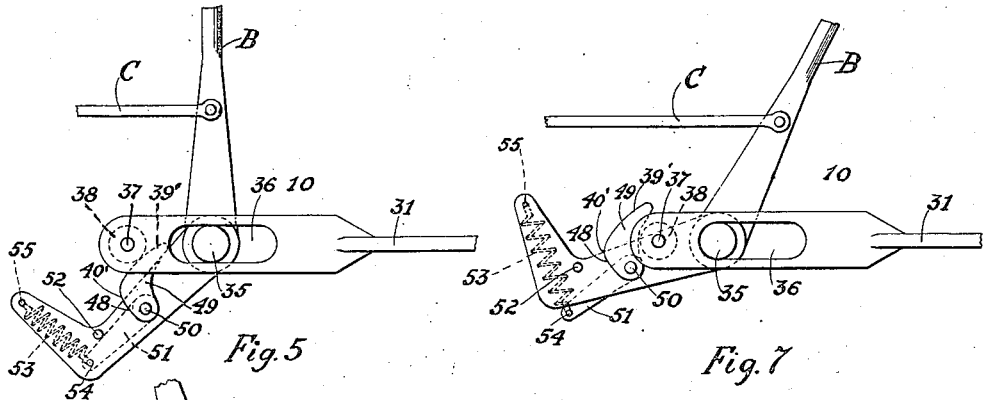
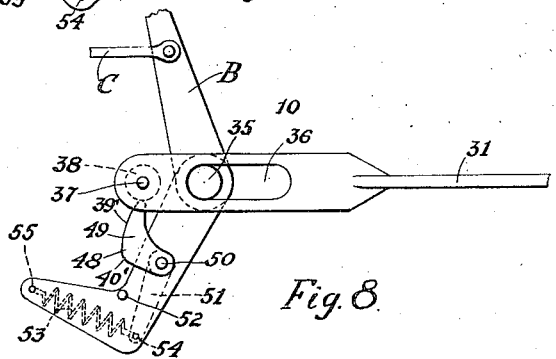
INVENTOR
LESTER H. MESSINGER, JR.
BY
G. H. Braddock
ATTORNEY Patented Feb. 2, 1932

1,843,238

UNITED STATES PATENT OFFICE

LESTER H. MESSINGER, JR., OF BRIDGEPORT, CONNECTICUT

BRAKING ATTACHMENT FOR INTERNAL-COMBUSTION ENGINES

Application filed March 15, 1927. Serial No. 175,611.

This invention relates to a braking attachment for internal combustion engines, and has more especial reference to a braking attachment for the engines of automotive vehicles.

An object of the invention is to provide a braking attachment for an automotive vehicle operated by an internal combustion engine adapted to the purpose of closing the exhaust line of the engine when operatively connected with the driven axle or wheels of said automotive vehicle and it is desired to build up pressure in the engine cylinders adapted to retard the upward or return advancement of the pistons, whereby to produce a braking action against said pistons, which braking action is communicated to said automotive vehicle.

A more specific object is to provide a braking attachment for an automotive vehicle operated by an internal combustion engine, which will be controlled and manipulated by the ordinary brake lever of said vehicle and will be adapted to the purpose of closing the exhaust line of the engine only when operatively connected with the driven axle or wheels of said automotive vehicle and it is desired to build up pressure in the engine cylinders adapted to retard the upward or return advancement of the pistons to produce a braking action against said pistons, and thus communicate the braking action to the automotive vehicle.

A further specific object is to provide a braking attachment for an automotive vehicle operated by an internal combustion engine, which will be controlled and manipulated by the ordinary friction brake lever of said vehicle, said braking attachment being associated with said fricton brake lever and said engine in such manner as to cause the exhaust line of said engine to close during the initial stages of operation of said brake lever when said engine is operatively connected with the driven axle or wheels of said vehicle to build up pressure in the engine cylinders adapted to retard the upward or return advancement of the pistons to produce a braking action against said pistons, which braking action is communicated to said automotive vehicle, and to cause said exhaust line to remain closed while said friction brake lever is depressed to cause a friction brake to function in customary manner.

A further specific object is to provide a braking attachment for an automotive vehicle operated by an internal combustion engine, which will be controlled and manipulated by the ordinary friction brake lever of said vehicle, said braking attachment being associated with said fricton brake lever and said engine in such manner as to cause the exhaust line of said engine to close, and an air inlet to the cylinders of said engine to be open to allow passage of air and no passage of explosive mixture to said cylinders, during the initial stages of operation of said brake lever when said engine is operatively connected with the driven axle or wheels of said vehicle to build up pressure in the engine cylinders adapted to retard the upward or return advancement of the pistons to produce a braking action against said pistons, and thus communicate the braking action to the automotive vehicle, and to cause said exhaust line to remain closed, and said air inlet to remain open, while said friction brake lever is depressed to cause a friction brake to function in customary manner.

A further specific object is to provide mechanism in connection with the braking attachment as hereinbefore briefly described adapted to cause said exhaust line to become open when said friction brake lever reaches a predetermined position during its depression, whereby to minimize the possibility of stalling an internal combustion engine by the application of the friction brake to a vehicle having said engine to bring said vehicle to a stop without destroying the operative connection between said engine and automatic vehicle by means of the usual clutch for this purpose.

A further specific object is to provide mechanism as just stated which will cause an air inlet to the cylinders of the engine to be open to allow passage of air and no passage of explosive mixture to said cylinders when said exhaust line is closed, and will allow the passage of explosive mixture to the cylinders simultaneously with the opening of said exhaust line.

A further specific object is to provide a braking attachment for an automotive vehicle operated by an internal combustion engine, which will be associated with the friction brake lever and the clutch lever of said vehicle on the one hand, and with the exhaust line, and preferably with an air inlet to the cylinders, of the engine on the other hand, adapted to the purpose of closing the exhaust line, and opening the air inlet to the cylinders to allow passage of air and no passage of explosive mixture to said cylinders, each time said brake lever is depressed and said clutch lever is in position to cause said engine to be operatively connected with the driven axle or wheels of said automotive vehicle, and to cause said exhaust line to be open, and said air inlet to be manipulated to allow the feeding of explosive mixture to said cylinders, either when said clutch lever is manipulated to break operative connection between said engine and automotive vehicle, or when said brake lever is in its inoperative position, that is, its position of highest elevation.

A further specific object is to provide a braking attachment as just stated, which will additionally include mechanism causing said exhaust line to be open, and said air inlet to be closed, when said engine is operatively connected with said vehicle and said brake lever is depressed to an extent sufficient to bring the vehicle to a stop, whereby to minimize the possibility of stalling an engine by the full application of the friction brake to a vehicle having said engine without first manipulating the clutch to break the operative connection between said engine and the driven axle or wheels of said vehicle.

With the above objects in view, as well as others which will appear as the specification proceeds, the invention comprises the construction, arrangement and combination of parts as now to be fully described and as hereinafter to be specifically claimed, it being understood that the disclosure herein is merely illustrative and intended in no way in a limiting sense, changes in details of construction and arrangement of parts being permissible so long as within the spirit of the invention and the scope of the appended claims.

In the accompanying drawings forming a part of this specification,

Fig. 1 is an elevational view of a braking attachment having the features of the invention, disclosing sufficient of an internal combustion engine and a brake lever, a clutch lever, and a brake rod of an automotive vehicle to illustrate the novel construction, the clutch lever being shown as when the engine is operatively engaged with the vehicle, the brake lever being shown in its inoperative position, the exhaust line being shown open, and the air inlet being shown closed;

Fig. 4 is an elevational view of a modified form of braking attachment having the features of the invention, disclosing sufficient of an internal combustion engine and a brake lever, a clutch lever, and a brake rod of an automotive vehicle to illustrate the novel construction, the clutch lever being shown as when the engine is operatively connected with the vehicle, the brake lever being shown as a trifle depressed, the exhaust line being shown as partially closed, and the air inlet being shown as partially open;

Fig. 4a is a diagrammatic side view of the connection between the brake rod and the braking mechanism.

Figure 1:
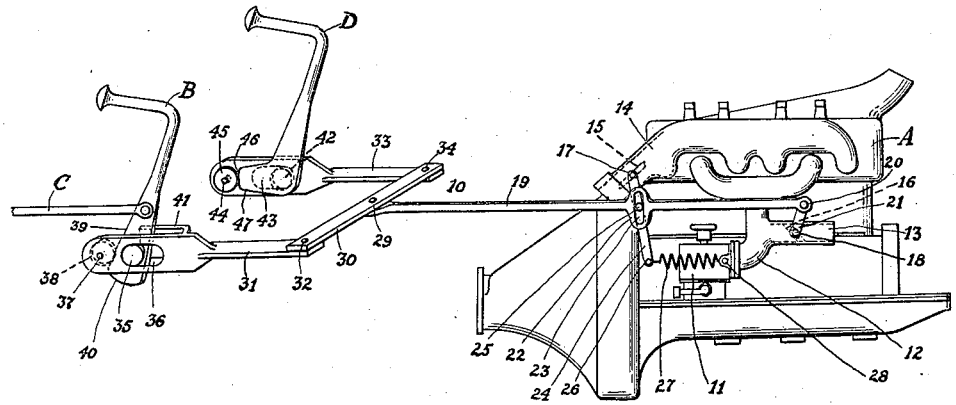

Fig. 5 is a detail of parts of the braking attachment associated with the friction brake lever, agreeing with the showing of Fig. 1;

Fig. 6 is a detail of the parts disclosed in Fig. 5, showing the friction brake lever as having reached almost fully depressed position and ready to release a manipulating bar of the braking attachment to allow the exhaust line to open and the air inlet to close;

Fig. 7 is a detail of the parts disclosed in Figs. 5 and 6, showing the braking attachment as engaging the friction brake lever to become again associated therewith after said manipulating bar is released and when said friction brake lever is allowed to return from its depressed position to its inoperative position; and Fig. 8 is a detail of the parts disclosed in Figs. 5 to 7, showing the mentioned manipulating bar of the braking attachment as when associating itself with the friction brake lever, the parts being located at about the midway point between the positions in which disclosed in Figs. 5 and 7 and moving from the position as in Fig. 7 back toward the position as in Fig. 5.

Figure 2:
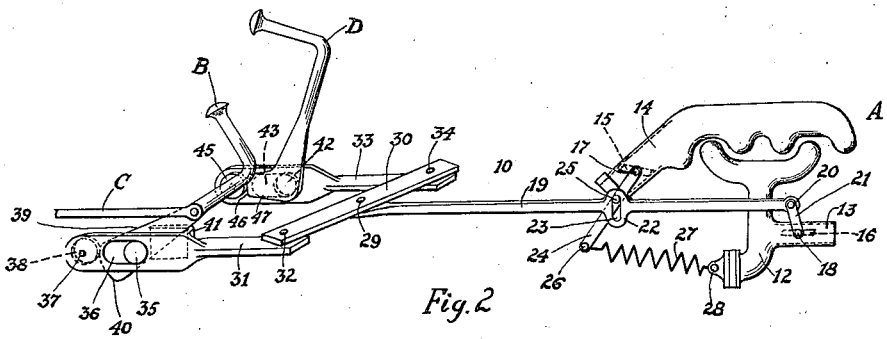
Fig. 2 is an elevational view of the essentials of Fig. 1, showing the clutch lever in its position as when the engine is operatively connected with the automotive vehicle, the brake lever partially depressed, the exhaust line closed, and the air inlet open.
Figure 3:
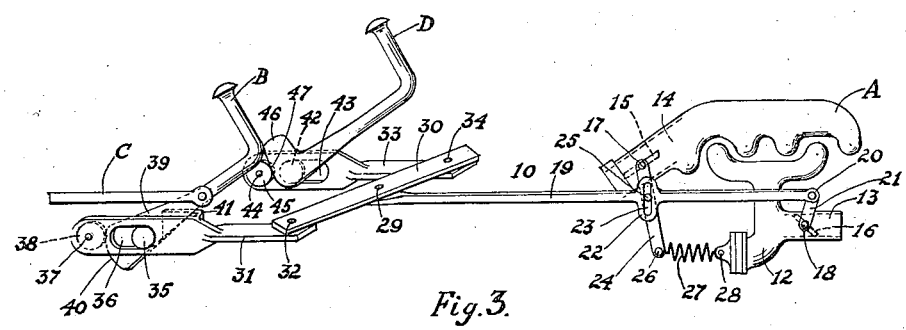
Fig. 3 is a view corresponding with the disclosure of Fig. 2, showing the clutch lever in position to break operative connection between the engine and vehicle, the brake lever partially depressed, the exhaust line open, and the air inlet closed.

With respect to Figs. 1 to 3 of the drawings, A represents an internal combustion engine, B an ordinary friction brake lever of a vehicle having said engine, C an ordinary brake rod pivoted upon said lever B, D the clutch lever of said vehicle, and 10 designates, generally, the braking attachment of the invention.

The engine A includes a carburetor 11, an intake manifold 12 between the carburetor and the engine cylinders, an air inlet 13 to the intake manifold, and an exhaust line 14 leading from the cylinders. Numeral 15 denotes a butterfly valve in the exhaust line 14 capable of controlling passage of exhaust gases and air from the cylinders and through said exhaust line, and 16 indicates a butterfly valve in the air inlet 13 capable of controlling passage of atmospheric air to the cylinders by vacuum or suction created in usual manner by the pistons (not shown) in said cylinders. The butterfly valve 15 is disclosed fixed upon a shaft 17 mounted in the walls of the exhaust outlet, and the butterfly valve 16 is disclosed as fixed upon a shaft 18 mounted in the walls of the air inlet.

Numeral 19 represents a reach rod pivoted at its forward end 20 to an arm 21 fixed upon the shaft 18, and having intermediate its ends an enlargement 22 provided with an elongated slot 23 extending transversely of the reach rod 19, the slot 23 being vertical as disclosed. An arm 24 fixed upon the shaft 17 has a pin 25 intermediate its ends situated in the slot 23, and the end 26 of said arm 24 spaced from said shaft 17 has secured to it one end of a coil spring 27 the other end of which is secured, as at 28, to a part of the engine. The normal tendency of the coil spring 27 is to press the butterfly valve 16 toward closed position and the butterfly valve 15 toward wide open position. See Figs. 1 and 3.

The rear end of the reach rod 19 is pivoted, as at 29, preferably to the midlength of a cross bar 30 extending transversely of said reach rod.

A manipulating bar 31 pivoted to one end of said cross bar 30 as at 32 is operatively associated with the friction brake lever B, and a manipulating bar 33 pivoted to the other end of said cross bar 30 as at 34 is operatively associated with the clutch lever D.

The friction brake lever B has a cylindrical shaft end 35 freely entering an elongated longitudinal, horizontal slot 36 in the manipulating bar 31, and said manipulating bar 31 has a shaft 37 supporting a pulley or wheel 38 adapted to ride over the rear edge 39 of said brake lever B and over the lower edge 40 of said brake lever, which lower edge is constructed upon an arc concentric with said cylindrical shaft end 35. A guide 41 upon one side of the manipulating bar 31 receives the portion of the friction brake lever B above the shaft end 35 to insure that the shaft end 35 will remain in the slot 36 and the pulley or wheel 38 will engage the edges 39 and 40 of said friction brake lever. Said shaft end 35 enters a fixed part of the vehicle frame to thus support the lever B.

The clutch lever D has a cylindrical shaft end 42 freely entering an elongated, longitudinal, horizontal slot 43 in the manipulating bar 33, and said manipulating bar 33 has a shaft 44 supporting a pulley or wheel 45 adapted to ride over the rear edge 46 and the lower edge 47 of said clutch lever. Said shaft end 42 also enters a fixed part upon the vehicle frame.

The manner in which the braking attachment functions in use will be readily apparent. When the clutch lever is in the position of operative connection between the engine A and a vehicle having said clutch lever, and the friction brake lever is in its inoperative position, its position of highest elevation, all as disclosed in Fig. 1, the pulley or wheel 45 is in engagement with the rear edge 46 of said clutch lever so that the manipulating bar 33 is held by said clutch lever in its farthest rearward position, the shaft end 42 being at the forward end of the slot 43, and the pulley or wheel 38 is in engagement with the rear edge 39 of said brake lever so that the manipulating bar is held by the coil spring 27 in its farthest forward position, against said rear edge 39 of said brake lever, the shaft end 35 being at the rearward end of the slot 36. It should be here remarked that the coil spring 27 is a weaker spring than the ordinary spring 61 (Fig. 4a) holding the brake lever, or the clutch lever, in elevated position.

Now when the manipulating bar 33 is held rearwardly by the clutch lever and the manipulating bar 31 is held forwardly by the coil spring 27, the cross bar 30 is situated to cause the butterfly valve 16 to be closed and the butterfly valve 15 to be wide open. The construction is such that at this time the coil spring 27 is allowed to press the reach rod 19 forwardly to an extent holding the butterfly valve 16 tightly closed, and the closed position of said valve 16 locates the reach rod at its farthest forward position to hold the butterfly valve 15 in wide open position.

Assume that the clutch lever remains in its position of Fig. 1 and the brake lever is depressed, as in Fig. 2, to apply the friction brake. This movement of the brake lever causes the rear edge 39 of said brake lever to ride upwardly and rearwardly against the pulley or wheel 38 of the manipulating bar 31 to draw said bar, and hence the cross bar 30 and reach rod 19, toward the rear of the vehicle, to thus throw the valve 15 to closed position and the valve 16 to open position. During this movement of the reach rod 19, the pin 25 upon the arm 24 rides in the slot 23. See Fig. 2.

Assume that the brake lever is depressed, as in Figs. 2 and 3, and the clutch lever is depressed, as in Fig. 3, to disengage the engine from operative connection with the vehicle. This depression of the clutch lever, obviously, allows the pulley or wheel 45 to ride off of the edge 46 and on to the edge 47 of the clutch lever, and the reach rod to return to approximately its position as in Fig. 1, where the valve 16 is closed and the valve 15 is open. The only differences between the disclosures of Fig. 1 and Fig. 3 are that in Fig. 3 the coil spring 27 is holding the manipulating bar 33 in forward position, so that the shaft end 42 is at the rearward end of the slot 43, and the brake lever B is holding the manipulating bar 31 in rearward position, while in Fig. 1, as already stated, the clutch lever D is holding the manipulating bar 33 in rearward position, and the coil spring 27 is holding the manipulating bar 31 in forward position.

Assume that the clutch lever is depressed, as in Fig. 3, while the brake lever is elevated, the only other condition (not shown) which is possible. The forward position of the reach rod will be limited by the closed position of the valve 16, and the shaft ends 35 and 42 of the brake lever and the clutch lever will lie idly in the elongated slots 36 and 43, respectively, of the manipulating bars 31 and 33, so that the attachment or device of the invention will not interfere in any manner with the working of the engine or the vehicle, as when, for example, coasting with clutch disengaged and brake not applied. At this time the coil spring 27 holds the valve 16 closed and the valve 15 wide open to allow the engine to idle in precisely the manner it would idle were not the novel braking attachment present.

As has been stated, the lower edge 40 of the friction brake lever B is concentric with the cylindrical shaft end 35, so that when the brake lever has reached its partially depressed position of Fig. 2, further depression of said brake lever will be permitted to allow application of friction brakes without changing or affecting the position of the reach rod 19. That is to say, the lower edge 40 of the brake lever B provides an arc shaped dwell concentric with the shaft end 35 allowing depression of the brake lever to cause the pulley or wheel 38 to roll over said arc shaped dwell without altering the position of the reach rod 19.

It will be seen that I have provided a braking attachment for an automotive vehicle, which is to be associated with the friction brake lever and the clutch lever of the vehicle, and with the exhaust line and an air inlet to the cylinders, which air inlet preferably is arranged to preclude the entrance of explosive mixture to the cylinders when said air inlet is open, adapted to close the exhaust line and to open the air inlet to cause the passage of air to the cylinders whenever the brake lever is depressed and the clutch lever is in position to operatively connect the engine with the vehicle, and adapted to open the exhaust line and close the air inlet to allow the ordinary feeding of explosive mixture to the cylinders either when the clutch lever is manipulated to break operative connection between engine and vehicle, or when the brake lever is allowed to be in its elevated, inactive position.

It will also be seen that I have provided a braking attachment which can hold the exhaust line closed and the air inlet open during the whole period a brake lever is being applied to cause a friction brake to stop a vehicle, so long as the engine and the vehicle having the engine are operatively connected.

In Figs. 4 to 8 I have disclosed a modified form of braking attachment having the features as hereinbefore described in connection with Figs. 1 to 3, and additionally having mechanism for causing the exhaust line to be open and the air inlet to be closed when the brake lever is depressed to an extent sufficient to bring the automotive vehicle to a stop, to thus minimize the possibility of stalling the engine by the full application of the friction brake without first manipulating the clutch to break operative connection between the engine and the vehicle.

In Fig. 4, A is the engine as before, B the ordinary friction brake lever, C the brake rod, D the clutch lever, 10 the braking attachment, 12 the intake manifold, 13 the air inlet, 14 the exhaust liner, 15 the butterfly valve in the exhaust line 14, 16 the butterfly valve in the air inlet 13, 17 the shaft in the exhaust outlet having the valve 15, 18 the shaft in the air inlet having the valve 16, 19 the reach rod pivoted at its forward end 20 to an arm 21 fixed upon the shaft 18, 22 the enlargement of the reach rod with elongated slot 23, 24 the arm fixed upon the shaft 17 and having a pin 25 intermediate its ends situated in the slot 23, and 26 is the end of the arm 24 to which the coil spring 27 is secured, which spring is attached at 28 to a part of the engine. The rear end of the reach rod 19 is pivoted, as at 29, to the cross bar 30, 31 is the manipulating bar pivoted to the cross bar at 32 and associated with the friction brake lever B, and 33 is the manipulating bar pivoted to the cross bar at 34 and associated with the clutch lever D.

The friction brake lever has a cylindrical shaft end 35, as before, freely entering the elongated slot 36 in the bar 31, and the bar 31 has a shaft 37 supporting a pulley or wheel 38 adapted to ride over a cam edge of a special device 48 (to be described) of the brake lever B.

The clutch lever D has a cylindrical shaft end 42 entering an elongated slot 43 in the manipulating bar 33, and the bar 33 has a shaft 44 supporting a pulley or wheel 45 adapted to ride over the rear edge 46 and the lower edge 47 of the clutch lever.

The special device 48 includes a cam 49 fixed upon a shaft 50 mounted in the lower portion of the brake lever B, said cam having the upper part 39' of its rear edge slanted in about the manner the rear edge 39 of Figs. 1 to 3 is slanted, and the lower part 40' of said rear edge arranged concentric with the cylindrical shaft end 35. The pulley or wheel 38 is adapted to ride over said parts 39′ and 40′ in precisely the manner that the pulley or wheel of Figs. 1 to 3 rides over the rear edge 39 and the lower edge 40 of the brake lever of said Figs. 1 to 3. An arm 51 fixed upon the shaft 50 is held in engagement with a pin 52 upon the brake lever B by a coil spring 53 secured to the end of the arm 51 spaced from the shaft 50 as at 54 and to an extension of said brake lever as at 55, the pin 52 thus rendering the cam 49 stable when used in the manner as already described in connection with Figs. 1 to 3 and as will be obvious.

In Fig. 4 the shaft end 42 of clutch lever D is mounted on the chassis of the vehicle, for example on the side rail 56. Lever D is connected to the collar of the conventional clutch 57 by means of the bell-crank lever 58 and link 59. In like manner the brake lever B is connected by brake rod C to the usual brake bank 60 and held in retracted position by the spring 61.

Clearly the braking attachment so far described in connection with Fig. 4 can function in precisely the manner as hereinbefore fully stated, the part 39′ of the rear edge of the cam 49 riding upwardly and rearwardly over the pulley or wheel 38 to move the reach rod 19 rearwardly to close the exhaust line valve 15 and open the air inlet valve 16 when the clutch lever is in the position as in Fig. 4, and the part 40′ of said rear edge of the cam 49 providing a dwell which is the full equivalent of the dwell 40 of Figs. 1 to 3.

In Fig. 6 I have disclosed the pulley or wheel 38 as at the lower end of the dwell 40′ and the friction brake lever as having reached almost fully depressed position. As will be evident from said Fig. 6, movement of said friction brake lever from the position disclosed to fully depressed position will cause said pulley or wheel 38 to ride off of the lower end of said edge 40′, and hence cause the manipulating bar 31 to be clear of the brake lever. Immediately this happens the coil spring 27 acts to throw said manipulating bar 31, together with the reach rod 19, forwardly, thus closing the valve 16 and opening the valve 15, and the parts will remain in forward position until the friction brake lever is allowed to return to its inactive position. As said friction brake lever is returning from its depressed position back to its elevated position, the shaft end 35, naturally, being at the rear of the elongated slot 36, the pulley or wheel 38 pushes against the forward, preferably curved edge of the cam 49, causing said cam to pivot rearwardly against the action of the coil spring 53, as disclosed in Fig. 7, and eventually, as shown in Fig. 8, said pulley or wheel 38 rides past the upper end of said cam 49, the coil spring 53 acts to return said cam to its normal position, with arm 51 against pin 52 and the pulley or wheel 38 seats against the upper end of the portion 39′ of the rear edge of said cam 49, in position to be again manipulated in the manner described.

It is far better in the instance of an inexperienced driver, however, to include the clutch lever and the cross mechanism between the brake and the clutch levers in the construction, so that depression of the clutch lever when coming to a stop can insure that the exhaust line will be open, the air inlet will be closed, and the feed of explosive mixture from the carburetor to the cylinders will be established.

It is obvious that closing the exhaust line of an engine builds up pressure in the cylinders to retard the upward or return advancement of the pistons, and communicates the resulting braking action to an automotive vehicle having the engine when said engine is operatively connected with a driven axle or wheels of said vehicle. It is also obvious that opening the cylinders to air which reaches the cylinders to the exclusion of explosive mixture when the exhaust line of an engine is closed, precludes explosions in the intake manifold, the cylinders and the exhaust outlet.

Various refinements and modifications of the subject matter of the invention may be made, such as will come within the scope of the claims hereto appended.

What I claim is:

1. In combination, friction brake operating means of a vehicle, an exhaust outlet of an internal combustion engine adapted to be operatively connected to said vehicle to propel the same, a valve in said exhaust outlet mechanism connecting said friction brake operating means with said exhaust outlet valve to cause said valve to be open when said friction brake operating means is in inactive position and to cause said valve to close during initial stages of actuation of said friction brake operating means when said engine is operatively connected with said vehicle and to remain closed during a period said friction brake operating means is operating to cause a friction brake to function in customary manner, and means directly associated with said friction brake operating means and said connecting mechanism for causing said exhaust outlet valve to open during final stages of operation of said friction brake operating means.

2. In combination, friction brake operating means of a vehicle, an exhaust outlet of an internal combustion engine adapted to be operatively connected to said vehicle to propel the same, a valve in said exhaust outlet, mechanism connecting said friction brake operating means with said exhaust outlet valve to cause said valve to be open when said friction brake operating means is in inactive position and to cause said valve to close during initial stages of actuation of said friction brake operating means and to remain closed during a period said friction brake operating means is operating to cause a friction brake to function in customary manner, and means directly associated with said friction brake operating means and said connecting mechanism for causing said exhaust outlet valve to be open during final stages of operation of said friction brake operating means.

3. In combination, friction brake operating means of a vehicle, an exhaust outlet of an internal combustion engine, clutch manipulating means adapted to bring about connection of said engine to said vehicle, a valve in said exhaust outlet, and mechanism connecting said friction brake operating means and said clutch manipulating means with said valve to cause said valve to close said exhaust outlet when said clutch manipulating means is positioned to operatively connect said engine with said vehicle and said friction brake operating means is actuated to cause a friction brake to function.

4. In combination, friction brake operating means of a vehicle, an exhaust outlet of an internal combustion engine, clutch manipulating means adapted to bring about connection of said engine to said vehicle, a valve in said exhaust outlet, and mechanism connecting said friction brake operating means and said clutch manipulating means with said valve to cause said valve to be in open position in said exhaust outlet when said friction brake operating means is in inactive position and to cause said valve to close said exhaust outlet when said clutch manipulating means is positioned to operatively connect said engine with said vehicle and said friction brake operating means is actuated to cause a friction brake to function.

5. In combination, friction brake operating means of a vehicle, an exhaust outlet of an internal combustion engine, clutch manipulating means adapted to bring about connection of said engine to said vehicle or to destroy operative connection between said engine and vehicle, a valve in said exhaust outlet, and mechanism connecting said friction brake operating means and said clutch manipulating means with said exhaust outlet valve to cause said valve to be in open position in said exhaust outlet when said friction brake operating means is in inactive position or when said clutch manipulating means is in position destroying connection between said engine and vehicle, and to cause said valve to close said exhaust outlet when said friction brake operating means is actuated to cause a friction brake to function and said clutch manipulating means is in position operatively connecting said engine with said vehicle.

6. In combination, friction brake operating means of a vehicle, an exhaust outlet of an internal combustion engine, clutch manipulating means adapted to bring about connection of said engine to said vehicle or to destroy operative connection between said engine and vehicle, a valve in said exhaust outlet, and mechanism connecting said friction brake operating means and said clutch manipulating means with each other and with said exhaust outlet valve to cause said valve to be open when said friction brake operating means is in inactive position or when said clutch manipulating means is in position destroying operative connection between said engine and vehicle, and to cause said valve to close said exhaust outlet when said friction brake operating means is actuated to cause a friction brake to function and said clutch manipulating means is in position operatively connecting said engine with said vehicle.

7. In combination, friction brake operating means of a vehicle, an exhaust outlet of an internal combustion engine, clutch manipulating means adapted to bring about connection of said engine to said vehicle or to destroy operative connection between said engine and vehicle, a valve in said exhaust outlet, and mechanism connecting said friction brake operating means and said clutch manipulating means to each other and with said exhaust outlet valve to cause said valve to be open when said friction brake operating means is in inactive position or when said clutch manipulating means is in position destroying operative connection between said engine and vehicle, and to cause said valve to close said exhaust outlet only when said friction brake operating means is actuated to cause a friction brake to function and said clutch manipulating means is in position operatively connecting said engine with said vehicle.

8. In combination, friction brake operating means of a vehicle, an exhaust outlet of an internal combustion engine, clutch manipulating means adapted to bring about connection of said engine to said vehicle or to destroy operative connection between said engine and vehicle, a valve in said exhaust outlet, and mechanism connecting said friction brake operating means and said clutch manipulating means with said exhaust outlet valve to cause said valve to be open when said friction brake operating means is in inactive position or when said clutch manipulating means is in position destroying operative connection between said engine and vehicle and to cause said valve to be closed during initial stages of actuation of said friction brake operating means when said clutch manipulating means is in position to operatively connect said engine with said vehicle and to remain closed while operative connection between said engine and vehicle exists and during the period said friction brake operating means is operating to cause a friction brake to function in customary manner.

9. In combination, friction brake operating means of a vehicle, an exhaust outlet of an internal combustion engine, clutch manipulating means adapted to bring about connection of said engine to said vehicle or to destroy operative connection between said engine and vehicle, a valve in said exhaust outlet, mechanism connecting said friction brake operating means and said clutch manipulating means with said exhaust outlet valve to cause said valve to be open when said friction brake operating means is in inactive position or said clutch manipulating means is in position to destroy operative connection between said engine and vehicle and to cause said valve to close during initial stages of actuation of said friction brake operating means when said clutch manipulating means is positioned to operatively connect said engine to said vehicle and to remain closed while said engine and vehicle are operatively connected and during a period said friction brake operating means is operating to cause a friction brake to function, and means associated with said connecting mechanism for causing said exhaust outlet valve to open during the final stages of operation of said friction brake operating means.

10. In combination, friction brake operating means of a vehicle, an exhaust outlet and an air inlet of an internal combustion engine, clutch manipulating means adapted to bring about connection of said engine to said vehicle, a valve in said exhaust outlet, a valve in said air inlet, and mechanism connecting said friction brake operating means and said clutch manipulating means with said exhaust outlet valve and said air inlet valve to cause said exhaust outlet valve to close said exhaust outlet and said air inlet valve to open said air inlet when said clutch manipulating means is positioned to operatively connect said engine with said vehicle and said friction brake operating means is actuated to cause a friction brake to function.

11. In combination, friction brake operating means of a vehicle, an exhaust outlet and an air inlet of an internal combustion engine, clutch manipulating means adapted to bring about connection of said engine to said vehicle, a valve in said exhaust outlet, a valve in said air inlet, and mechanism connecting said friction brake operating means and said clutch manipulating means with said exhaust outlet valve and said air inlet valve to cause said exhaust outlet valve to be in open position in said exhaust outlet and said air inlet valve to be in closed position in said air inlet when said friction brake operating means is in inactive position and to cause said exhaust outlet valve to close said exhaust outlet and said air inlet valve to open said air inlet when said clutch manipulating means is positioned to operatively connect said engine with said vehicle and said friction brake operating means is actuated to cause a friction brake to function.

12. In combination, friction brake operating means of a vehicle, an exhaust outlet and an air inlet of an internal combustion engine, clutch manipulating means adapted to bring about connection of said engine to said vehicle or to destroy operative connection between said engine and vehicle, a valve in said exhaust outlet, a valve in said air inlet, and mechanism connecting said friction brake operating means and said clutch manipulating means with said exhaust outlet valve and said air inlet valve to cause said exhaust outlet valve to be in open position in said exhaust outlet and said air inlet valve to be in position in said air inlet to allow passage of explosive mixture to the cylinders of said engine when said friction brake operating means is in inactive position or when said clutch manipulating means is in position destroying connection between said engine and vehicle, and to cause said exhaust outlet valve to close said exhaust outlet and said air inlet valve to open said air inlet when said friction brake operating means is actuated to cause a friction brake to function and said clutch manipulating means is in position operatively connecting said engine with said vehicle.

13. In combination, friction brake operating means of a vehicle, an exhaust outlet and an air inlet of an internal combustion engine, clutch manipulating means adapted to bring about connection of said engine to said vehicle or to destroy operative connection between said engine and vehicle, a valve in said exhaust outlet, a valve in said air inlet, and mechanism connecting said friction brake operating means and said clutch manipulating means to each other and with said exhaust outlet valve and air inlet valve to cause said exhaust outlet valve to be open and said air inlet valve to be closed when said friction brake operating means is in inactive position or when said clutch manipulating means is in position destroying operative connection between said engine and vehicle, and to cause said exhaust outlet valve to close said exhaust outlet and said air inlet valve to open said air inlet when said friction brake operating means is actuated to cause a friction brake to function and said clutch manipulating means is in position operatively connecting said engine with said vehicle.

14. In combination, friction brake operating means of a vehicle, an exhaust outlet and an air inlet of an internal combustion engine, clutch manipulating means adapted to bring about connection of said engine to said vehicle or to destroy operative connection between said engine and vehicle, a valve in said exhaust outlet, a valve in said air inlet, and mechanism connecting said friction brake operating means and said clutch manipulating means to each other and with said exhaust outlet valve and said air inlet valve to cause said exhaust outlet valve to be open and said air inlet valve to be closed when said friction brake operating means is in inactive position or when said clutch manipulating means is in position destroying operative connection between said engine and vehicle, and to cause said exhaust outlet valve to close said exhaust outlet and said air inlet valve to open said air inlet only when said friction brake operating means is actuated to cause a friction brake to function and said clutch manipulating means is in position operatively connecting said engine with said vehicle.

15. In combination, friction brake operating means of a vehicle, an exhaust outlet and an air inlet of an internal combustion engine, clutch manipulating means adapted to bring about connection of said engine to said vehicle or to destroy operative connection between said engine and vehicle, a valve in said exhaust outlet, a valve in said air inlet, and mechanism connecting said friction brake operating means and said clutch manipulating means with said exhaust outlet valve and said air inlet valve to cause said exhaust outlet valve to be open and said air inlet valve to be closed when said friction brake operating means is in inactive position or when said clutch manipulating means is in position destroying operative connection between said engine and vehicle and to cause said exhaust outlet valve to close and said air inlet valve to open during initial stages of actuation of said friction brake operating means when said clutch manipulating means is in position to operatively connect said engine with said vehicle and said exhaust outlet valve to remain closed and said air inlet valve to remain open while operative connection between said engine and vehicle exists and during at least a part of the period said friction brake operating means is operating to cause a friction brake to function in customary manner.

16. In combination, friction brake operating means of a vehicle, an exhaust outlet and an air inlet of an internal combustion engine, clutch manipulating means adapted to bring about connection of said engine to said vehicle or to destroy operative connection between said engine and vehicle, a valve in said exhaust outlet, a valve in said air inlet, mechanism connecting said friction brake operating means and said clutch manipulating means with said exhaust outlet valve and said air inlet valve to cause said exhaust outlet valve to be open and said air inlet valve to be closed when said friction brake operating means is in inactive position or said clutch manipulating means is in position to destroy operative connection between said engine and said vehicle and to cause said exhaust outlet valve to close and said air inlet valve to open during initial stages of actuation of said friction brake operating means when said clutch manipulating means is positioned to operatively connect said engine to said vehicle and said exhaust outlet valve to remain closed and said air inlet valve to remain open while said engine and vehicle are operatively connected and during a period said friction brake operating means is operating to cause a friction brake to function, and means associated with said connecting mechanism for causing said exhaust outlet valve to open and said air inlet valve to close during the final stages of operation of said friction brake operating means.

17. In combination, a friction brake lever of a vehicle, an exhaust outlet of an internal combustion engine, a clutch lever adapted to bring about connection of said engine to said vehicle or destroy operative connection between said engine and vehicle, a valve in said exhaust outlet, a reach rod connected to said valve, a cross bar pivoted upon said reach rod, a manipulating bar pivoted to said cross bar and associated with said friction brake lever, and a manipulating bar pivoted to said cross bar and associated with said clutch lever.

18. In combination, a friction brake lever of a vehicle, an exhaust outlet of an internal combustion engine, a clutch lever adapted to bring about connection of said engine to said vehicle or destroy operative connection between said engine and vehicle, a valve in said exhaust outlet, a reach rod connected to said valve, a cross bar pivoted intermediate its ends to said reach rod, a manipulating bar pivoted to an end of said cross bar and associated with said friction brake lever, and a manipulating bar pivoted to the other end of said cross bar and associated with said clutch lever.

19. In combination, a friction brake lever of a vehicle, an exhaust outlet and an air inlet of an internal combustion engine, a clutch lever adapted to bring about connection of said engine to said vehicle or destroy operative connection between said engine and vehicle, a valve in said exhaust outlet, a valve in said air inlet, a reach rod connected to both of said valves, a cross bar pivoted upon said reach rod, a manipulating bar pivoted to said cross bar and associated with said friction brake lever, and a manipulating bar pivoted to said cross bar and associated with said clutch lever.

20. In combination, a friction brake lever of a vehicle, an exhaust outlet and an air inlet of an internal combustion engine, a clutch lever adapted to bring about connection of said engine to said vehicle or destroy operative connection between said engine and vehicle, a valve in said exhaust outlet, a valve in said air inlet, a reach rod connected to both of said valves, a cross bar pivoted intermediate its ends to said reach rod, a manipulating bar pivoted to an end of said cross bar and associated with said friction brake lever, and a manipulating bar pivoted to the other end of said cross bar and associated with said clutch lever.

21. In combination, a friction brake lever of a vehicle, a valve of an internal combustion engine, a clutch lever adapted to bring about connection of said engine to said vehicle or destroy operative connection between said engine and vehicle, a reach rod connected to said valve, a cross bar pivoted upon said reach rod, a manipulating bar pivoted upon said cross bar, means associating said manipulating bar with said brake lever, a second manipulating bar pivoted upon said cross bar, means associating said second manipulating bar with said clutch lever, and a spring normally urging said reach rod in direction away from said brake lever and clutch lever.

22. The combination as specified in claim 21, wherein the means associating said manipulating bar with said brake lever is adapted to cause said reach rod to move against the action of said spring toward said brake lever and clutch lever when said brake lever is moved from inactive position toward operating position, and wherein the means associating said second manipulating bar with said clutch lever is adapted to cause said reach rod to move against the action of said spring toward said brake lever and clutch lever when said clutch lever is moved to its position of operative connection between the engine and vehicle from its position destroying operative connection between said engine and vehicle.

23. In a device of the character described, a friction brake lever of a vehicle, a valve manipulating bar, a spring urging said bar away from said brake lever, and means of said bar ridable upon means of said brake lever to cause said bar to move against the action of said spring when said brake lever is initially moved from inactive position toward operating position, said means of said bar and said means of said brake lever including a dwell causing said manipulating bar to have fixed position relative to said vehicle during a period, after initial movement of said brake lever, when said brake lever is operating to cause a friction brake to function.

24. In a device of the character described, a friction brake lever of a vehicle, a valve manipulating bar, a spring urging said bar away from said brake lever, and means of said bar ridable upon means of said brake lever to cause said bar to move against the action of said spring when said brake lever is initially moved from inactive position toward operating position, said means of said bar and said means of said brake lever including a dwell causing said manipulating bar to have fixed position relative to said vehicle during a period, after initial movement of said brake lever, when said brake lever is operating to cause a friction brake to function, and said means of said bar being adapted to ride clear of said means of said brake lever as said brake lever approaches the final stage of its braking operation to allow said spring to act upon said manipulating bar.

25. The combination as specified in claim 24, and mechanism causing said means of said manipulating bar to return to position where it can again engage said means of said brake lever when said brake lever is returned to inactive position.

26. In a device of the character described, a friction brake lever of a vehicle, a valve manipulating bar, a spring urging said bar away from said brake lever, means of said bar ridable upon means of said brake lever to cause said bar to move against the action of said spring when said brake lever is moved from inactive position toward operating position, said means of said bar being adapted to ride clear of said brake lever as said brake lever approaches the final stage of its braking operation to allow said spring to act upon said manipulating bar, and mechanism causing said means of said manipulating bar to return to position where it can again engage said means of said brake lever when said brake lever is returned to inactive position.

27. In a device of the character described, a friction brake lever of a vehicle, a manipulating bar having a slot, a protuberance upon said brake lever ridable in said slot, a spring urging said bar away from said brake lever, a cam rotatably mounted upon said brake lever, an arm fixed to rotate with said cam, a stop on said brake lever, a spring normally holding said arm in engagement with said stop, and means on said bar ridable upon a face of said cam in a manner urging said arm against said stop when said brake lever is moved from inactive position toward operating position to cause said bar to move against the action of said spring urging said bar away from said brake lever, said means of said bar being adapted to ride clear of said cam as said brake lever approaches the final stage of its braking operation to allow said first mentioned spring to act upon said bar, and said brake lever being adapted upon returning from position of release of said bar to inactive position to first cause said means on said bar to engage said cam to rotate the same in position moving said arm away from said stop and to finally pass said cam and position itself against said face of said cam upon which said means on said bar is ridable.

Signed at Bridgeport, in the county of Fairfield and State of Connecticut, this 8th day of March, A. D. 1927.

LESTER H. MESSINGER, Jr.